April 22, 1958 F. V. KADRI 2,832,048
ADJUSTMENT ASSEMBLY FOR WATTHOUR METERS
Filed Oct. 28, 1954

WITNESSES:
E. A. McCloskey.
David M. Schiller

INVENTOR
Frederick V. Kadri.
BY
R. L. Freedman
ATTORNEY

United States Patent Office 2,832,048
Patented Apr. 22, 1958

2,832,048

ADJUSTMENT ASSEMBLY FOR WATTHOUR METERS

Frederick V. Kadri, Madison, N. J., assignor to Westinghouse Electric Corporation, East Pittsburgh, Pa., a corporation of Pennsylvania Application October 28, 1954, Serial No. 465,162

2 Claims. (Cl. 324—138)

This invention relates to adjustment assemblies, and has particular relation to adjustment assemblies for electrical instruments.

Although the invention is suitable for various types of electrical instruments, it is particularly adapted for employment in integrating watthour meters and will be described in connection with such meters.

In the past, adjustment assemblies have been provided which include a supporting bracket for mounting an element for adjustment relative to the bracket along a desired axis. Such assemblies have further included a resilient member for biasing the adjustable element into engagement with the bracket to assure positive adjustment of the element along the desired axis.

According to the invention, an adjustment assembly is provided including a bracket proportioned to detachably mount an element for adjustment relative to the bracket only along a desired axis. For this purpose, the bracket and element are provided with integral interfitting parts proportioned to detachably mount the element for the desired adjustment.

The invention further provides a resilient member proportioned for detachable mounting to the bracket to bias the adjustable element into engagement with the bracket. The resilient member and bracket are provided with integral interfitting parts proportioned to detachably mount the resilient member for engagement with the adjustable element in a tensioned condition to permit positive adjustment of the element only along the desired axis. With such arrangement, the resilient member is conveniently cleared for detachment from the bracket in response to deformation of the resilient member within the elastic limit thereof.

In a specific embodiment of the invention, the adjustment assembly is associated with a watthour meter including a magnetic structure. The supporting bracket is secured to the magnetic structure to mount an electroconductive element for adjustment relative to the magnetic structure. The bracket is proportioned to mount the element for adjustment to intercept a variable portion of the voltage magnetic flux to control the light load response of the meter.

It is, therefore, an object of the invention to provide an improved adjustment assembly.

It is a further object of the invention to provide an adjustment assembly for a watthour meter which is readily assembled and disassembled relative to the meter.

It is still another object of the invention to provide an adjustment assembly including an adjustable element detachably mounted for positive adjustment relative to an element supporting bracket by means of a resilient member detachably carried by the bracket.

It is a still further object of the invention to provide an improved method of detachably securing a resilient member to a supporting bracket in a tensioned condition.

Other objects of the invention will be apparent from the following description in conjunction with the accompanying drawing, in which.

Figure 1:
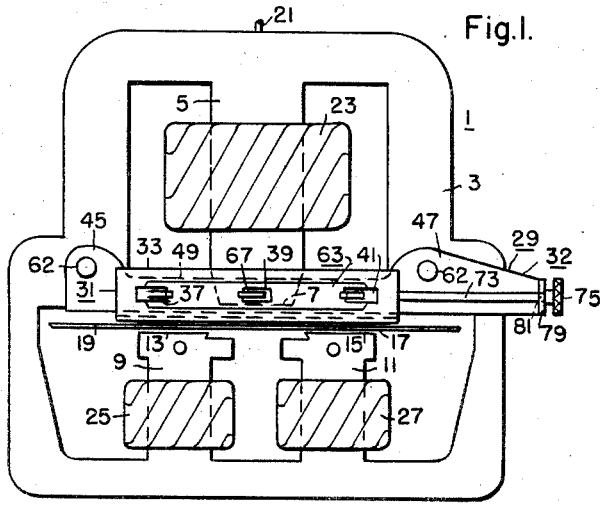
Figure 1 is a view in front elevation of a watthour meter embodying the invention.

Referring to the drawing, there is illustrated in Fig. 1 an alternating current watthour meter represented generally by the numeral 1 embodying the teachings of the invention. The meter 1 includes a magnetic structure 3 constructed of a plurality of magnetic laminations each having the configuration illustrated in Fig. 1.

The structure 3 includes a voltage magnetic pole 5 having a pole face 7 and a pair of spaced current magnetic poles 9 and 11 having respectively pole faces 13 and 15. By inspection of Fig. 1, it will be observed that the pole faces 13 and 15 are disposed in a common plane which is spaced from and parallel to the plane defined by the pole face 7 to define an air gap 17. An electroconductive disc 19 is mounted for rotation by a shaft 21 with a portion of the disc 19 being positioned within the air gap 17.

In order to provide a shifting magnetic field in the air gap 17 for influencing the disc 19, the voltage pole 5 is surrounded by a voltage winding 23, and the current poles 9 and 11 are surrounded by current windings 25 and 27, with the current windings being connected in series circuit relation and being oppositely poled relative to each other. Energization of the winding 23 from a source of alternating voltage is effective to produce an alternating voltage magnetic flux which combines with alternating current magnetic flux produced by energization of the current windings 25 to 27 from a source of alternating current to provide the shifting magnetic field. As thus far described, the meter 1 is similar in all respects to the meter disclosed in U. S. Patent No. 2,512,345, issued to R. M. Leippe.

In order to correct the response of the meter 1 for light load conditions of an associated circuit (not shown), a light load adjustment assembly is provided. Such assembly is represented generally in Fig. 1 by the numeral 29, and includes an electroconductive element 31 mounted for adjustment relative to the magnetic structure 3 to intercept a variable portion of the voltage magnetic flux. As is understood in the art, the element 31 is effective to lag the voltage flux to apply a torque to the rotatable disc 19 for correcting the response of the meter at light load conditions of an associated circuit (not shown).

The plate 31 may be constructed of any suitable electroconductive material such as copper or aluminum. The plate 31 may be of any desired configuration. In a preferred embodiment of the invention, the plate 31 is of hollow construction having a rectangular configuration.

In order to facilitate mounting of the plate 31 to an associated supporting bracket 32, the plate 31 is provided with a flange 33 which is displaced from the plane of the plate 31 to define a plane which extends substantially at right angles to the plane of the plate 31. The flange 33 includes a surface 35 which is adapted for engagement with a guide surface of the bracket 32 as will presently appear.

Figure 4:
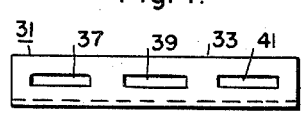
Figs. 4, 5 and 6 are views in front elevation of different parts of the assembly of Fig. 3.

In order to detachably mount the plate 31 to the bracket 32, the invention provides that the plate and the bracket have integral interfitting parts proportioned to permit adjustment of the plate 31 relative to the bracket 32 only along a desired axis. To this end, the flange 33 of the plate 31 is provided with a plurality of slots 37, 39 and 41 spaced along the flange 33 as best shown in Fig. 4. The slots are proportioned to receive suitable projections of the bracket 32 as will presently appear.

Figure 2:
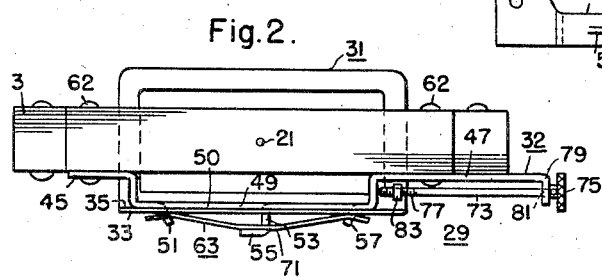
Fig. 2 is a view in top plan of the meter of Fig. 1 with parts removed.
Figure 5:
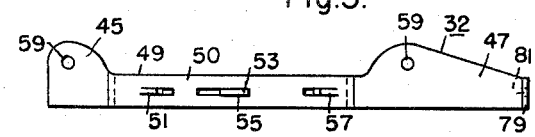

Details of the construction of the bracket 32 are best illustrated in Figs. 2 and 5. As there shown, the bracket 32 includes a pair of terminal portions 45 and 47 and a central portion 49. As viewed in Fig. 2, the terminals 45 and 47 are disposed substantially in a common plane. The central portion 49 of the bracket 32 is displaced from the plane of the terminals 45 and 47, and includes a guide surface 50 adapted for engagement with the surface 35 of the plate 31 when the plate is assembled to the bracket.

Figure 3:
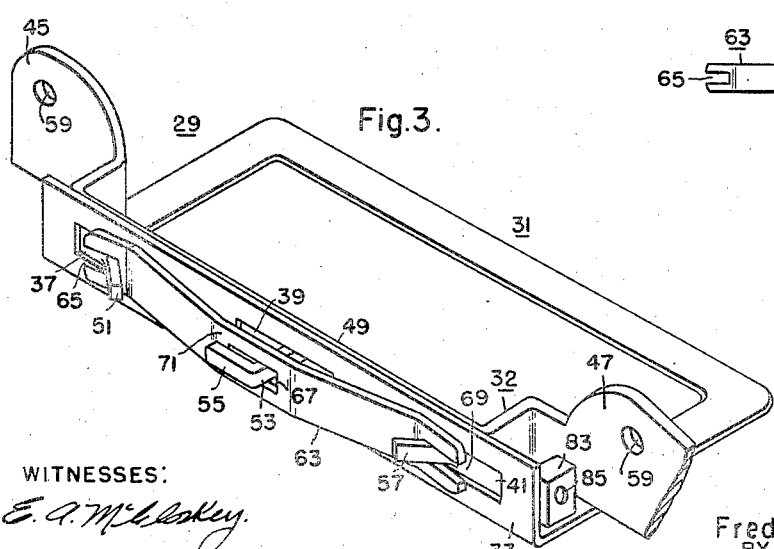
Fig. 3 is a view in perspective of an adjustment assembly of the meter of Figs. 1 and 2.

As best shown in Figs. 2 and 3, the bracket 32 includes a plurality of spaced projections 51, 53 and 57 which extend from the surface 50 of the portion 49 for the purpose of mounting the plate 31. As shown in Fig. 2, the projections 51 and 57 extend angularly from the surface 50 toward each other. The projection 53 includes an extension or lip portion 55 which is spaced from the surface 50 and which extends toward the projection 51.

In order to secure the bracket 32 to the magnetic structure 3, the terminals 45 and 47 are each provided with a separate opening 59 proportioned to receive suitable rivets 62, or other securing means, adapted to extend through the magnetic structure 3. The bracket 32 may be constructed of any suitable material. In a preferred embodiment of the invention the bracket 32 is constructed of a non-magnetic material, such as brass, so as to prevent interference with magnetic flux traversing the structure 3.

In order to assemble the plate 31 and the bracket 32, the plate 31 is positioned directly beneath the voltage pole 5 of the structure 3 to have the flange 33 of the plate in parallel overlapping relation with respect to the portion 49 of the bracket. The plate 31 is then adjusted to pass the slots 37, 39 and 41 thereof over the projections 51, 53 and 57 of the bracket respectively. The cooperating slots and projections of the plate 31 and bracket 32 are proportioned to permit adjustment of the plate relative to the bracket only along an axis extending parallel to the voltage pole face 7 and parallel to the surface 50 of the bracket.

In order to assure positive adjustment of the plate 31 relative to the bracket 32 along the desired axis, suitable biasing means are provided in accordance with the invention to bias the surface 35 of the plate 31 into engagement with the guide surface 50 of the bracket 43. The biasing means is conveniently in the form of a resilient strip 63 which may be constructed of any suitable resilient material. Preferably, the strip 63 is constructed of a non-magnetic resilient material such as Phosphor bronze. In the specific embodiment of the invention, the strip 63 is of bowed configuration when in the untensioned condition.

Figure 6:
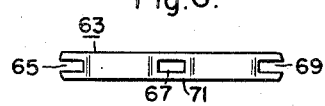

In order to permit detachable mounting of the strip 63 to the bracket 32, the invention provides that the strip and bracket have integral interfitting parts. To this end, the strip 63 is provided with a plurality of slots proportioned to receive the projections of the bracket 32. As best shown in Fig. 6, the strip 63 is provided with slots 65, 67 and 69 spaced along the strip 63, with the slots 65 and 69 each having an opened end and with the slot 67 positioned in the bowed portion 71 of the strip 63.

In order to mount the strip 63 to the assembled plate 31 and bracket 32, the following steps are performed. The strip 63 is initially positioned adjacent the flange 33 of the plate 31 to have the projection 57 of the bracket 32 extending through one of the slots 65 and 69 of the strip with the bowed portion 71 of the strip spaced from the flange 33 of the plate 31. Inasmuch as the strip 63 is of symmetrical construction, either one of the slots 65 and 69 may be associated with the projection 57 of the bracket. For purposes of discussion, it will be assumed that the strip 63 is positioned initially with the projection 57 of the bracket extending through the slot 69 of the strip to have the slot 67 of the strip in alignment with the projection 53 of the bracket 32.

With the strip 63 positioned relative to the plate and bracket assembly as described, the bowed portion 71 of the strip is then depressed in the direction for passing the slot 67 of the strip over the lip portion 55 of the projection 53 of the bracket. The strip 63 is then moved in the depressed condition along an axis toward the projection 57 of the bracket to simultaneously effect locking engagement of the lip 55 of the projection 53 with the bowed portion 71 of the strip, and to effect engagement of the opening 65 of the strip with the projection 51 of the bracket with a snap action.

By such operation, the strip 63 is secured to the bracket 32 in a tensioned condition with the result that portions of the strip adjacent the slots 65 and 69 thereof bear against the flange 33 of the plate 31 to bias the surface 35 of the plate 31 into engagement with the guide surface 50 of the portion 49 of the bracket 32.

In order to detach the strip 63 from the bracket 32, it is only necessary to depress the bowed portion 71 of the strip to release the portion 71 from engagement with the lip 55 of the projection 53 to thereby clear the strip 63 for movement along an axis toward the projection 57. Such axial movement of the strip 63 is effective to permit withdrawal of the slot 65 from the projection 51 in response to flexure of the end of the strip containing the slot 65 in a direction away from the flange 33. The strip in this flexed condition may then be moved axially away from the projection 57 to effect withdrawal of the slots 67 and 69, respectively from the projections 53 and 57. The several slots and projections are arranged such that axial movement of the strip when in an operative position is ineffective to release the portion 71 from engagement with the lip 55 of the projection 53.

In order to effect adjustment of the plate 31 relative to the bracket 32 and structure 3, suitable actuating means are provided. As shown in Figs. 1 and 2, the actuating means includes an elongated screw member 73 having an enlarged head portion 75 and a threaded end portion 77.

In order to mount the screw member 73 for adjustment to effect proper movement of the plate 31 relative to the bracket 32, suitable bearing means are provided. To this end, the bracket 32 is provided with a flange 79 which extends from the terminal 47 substantally at right angles to the terminal 47 as best shown in Fig. 2. The flange 79 includes an opening 81 extending therethrough proportioned to receive the screw 73. Additional bearing means are associated with the plate 31 in the form of a block 83 carried by the plate 31 having a threaded opening 85 proportioned to receive the threaded end 77 of the screw 73.

The screw 73 is positioned to extend through the openings 81 and 85 with the head 75 thereof in engagement with the flange 79 of the bracket, and with the threaded end 77 thereof in engagement with the threaded opening 85. With such arrangement, the screw 73 is mounted for rotation about its own axis without substantial axial movement to effect adjustment of the plate 31 relative to the magneic structue 3 along the desired axis.

Since certain changes may be made in the above apparatus, and different embodiments of the invention could be made without departing from the scope thereof, it is intended that all matter contained in the above description or shown in the accompanying drawing shall be interpreted as illustrative and not in a limiting sense.

I claim as my invention:

1. In a mechanical assembly, a first member including a first surface having a pair of spaced first openings with a second opening intermediate said first openings, a second member including a second surface having a pair of spaced first integral projections extending angularly therefrom toward each other with a second integral projection intermediate said first projections, said second projection having a lip portion spaced from said second surface extending toward one of said first projections, said members being positioned with said surfaces in engagement to have said first and second projections extending respectively through said first and second openings, said projections and openings being proportioned and positioned to permit relative movement between said members along an axis extending parallel to said surfaces, retaining means for retaining said surfaces in engagement to guide said first member for movement along said axis, said retaining means comprising a resilient strip having a pair of spaced first slots with a second slot intermediate said first slots, said strip being positioned in engagement with said first member with a separate one of said first projections extending through each of said first slots to engage said strip, and with said second projection extending through said second slot to have said lip portion engaging said strip, said projections being proportioned to mount said strip in a tensioned condition to bias said surfaces into engagement, said projections and slots being proportioned and positioned to mount said strip such that the strip is cleared for detachment relative to said projections in response to flexure of the strip within the elastic limit thereof, and means for effecting movement of said first member relative to said second member along said axis.

2. In an electroresponsive device, a magnetic structure including a first magnetic pole having a first pole face and a pair of spaced second magnetic poles having second pole faces, said second pole faces defining a common plane spaced from the plane of the first pole face to define an air gap, first windings surrounding said first pole effective when energized to produce an alternating first flux, second windings surrounding said second poles effective when energized to produce an alternating second flux cooperating with the first flux to establish a shifting magnetic field in the air gap, armature means mounted for rotation through the air gap under the influence of said shifting magnetic field, and control means for controlling said first flux, said control means including a guide bracket having a first guide surface with a pair of spaced first integral projections extending angularly therefrom toward each other and a second integral projection intermediate said first projections, said second projection having a lip portion spaced from said first surface extending toward one of said first projections, said bracket being secured to said magnetic structure with said first surface in a plane transverse to said common plane to have said projections extending away from said magnetic structure, an electroconductive element including a first part and a second part transverse to said first part having a second guide surface, said second surface having a pair of spaced first openings with a second opening intermediate said first openings, said element being positioned with said first part within said air gap in a plane parallel to said common plane for intercepting said first flux to have said second surface engaging said first surface with said first and second projections extending respectively through said first and second openings, said projections and openings being proportioned and positioned to permit movement of said element relative to said bracket along an axis extending parallel to said common plane, retaining means for retaining said surfaces in engagement to guide said element for movement along said axis, said retaining means comprising a resilient strip having a pair of spaced first slots with a second slot intermediate said first slots, said strip being positioned in engagement with the second part of said element to have a separate one of said first projections extending through each of said first slots to engage said strip, and with said second projection extending through said second slot to have said lip portion engaging said strip, said projections being proportioned to mount said strip in a tensioned condition to bias said surfaces into engagement, and to permit clearing of said strip for detachment relative to said projections in response to flexure of the strip within the elastic limit thereof, and means for effecting movement of said element relative to said bracket along said axis.

References Cited in the file of this patent

UNITED STATES PATENTS

| | | |
|---|---|---|
| 485,011 | Kneeland | Oct. 25, 1892 |
| 1,734,229 | Ratz | Nov. 5, 1929 |